(12) United States Patent
Song et al.

(10) Patent No.: US 9,641,083 B2
(45) Date of Patent: May 2, 2017

(54) CONTROL DEVICE AND CONTROL METHOD OF POWER CONVERTER AND SWITCHING POWER SUPPLY USING THE SAME

(71) Applicant: DELTA ELECTRONICS (SHANGHAI) CO., LTD., Shanghai (CN)

(72) Inventors: Haibin Song, Shanghai (CN); Yuanqiang Gu, Shanghai (CN); Jian Zhou, Shanghai (CN); Daofei Xu, Shanghai (CN)

(73) Assignee: DELTA ELECTRONICS (SHANGHAI) CO., LTD. (CN)

( * ) Notice: Subject to any disclaimer, the term of this patent is extended or adjusted under 35 U.S.C. 154(b) by 71 days.

(21) Appl. No.: 14/518,752

(22) Filed: Oct. 20, 2014

(65) Prior Publication Data
US 2015/0280575 A1    Oct. 1, 2015

(30) Foreign Application Priority Data

Mar. 31, 2014    (CN) .......................... 2014 1 0127624

(51) Int. Cl.
*H02M 3/335*    (2006.01)
*H02M 1/32*    (2007.01)
(Continued)

(52) U.S. Cl.
CPC ......... *H02M 3/33507* (2013.01); *H02M 1/32* (2013.01); *H02M 3/156* (2013.01);
(Continued)

(58) Field of Classification Search
CPC ......... H02M 3/33523; H02M 3/33507; H02M 2001/0025; H02M 2001/0009; H02M 1/32; H02M 3/156
See application file for complete search history.

(56) References Cited

U.S. PATENT DOCUMENTS

2005/0254184 A1    11/2005 Fukui
2007/0236962 A1    10/2007 Minkkinen
(Continued)

FOREIGN PATENT DOCUMENTS

DE    10013215    9/2001
TW    M435016    8/2012
(Continued)

OTHER PUBLICATIONS

Office Action dated Jul. 28, 2015 from corresponding No. TW 103116170.
(Continued)

*Primary Examiner* — Jue Zhang
*Assistant Examiner* — Lakaisha Jackson
(74) *Attorney, Agent, or Firm* — Hauptman Ham, LLP

(57) ABSTRACT

The disclosure relates to a control device, a control method of a power converter and a switching power supply using the control device. The control device of the power converter includes: a first control unit, which is coupled to the power converter to detect an output voltage of the power converter and is configured to generate a first control signal based on the output voltage; a variable resistor unit, which is connected to an output terminal of the first control unit to receive the first control signal and is configured to generate a resistance value based on the first control signal; and a second control unit, which is connected to the variable resistor unit and is configured to output a second control signal in order to control operations of a switch unit of the power converter.

23 Claims, 10 Drawing Sheets

(51) Int. Cl.
  *H02M 3/156* (2006.01)
  *H02M 1/00* (2006.01)

(52) U.S. Cl.
  CPC ............... *H02M 2001/0009* (2013.01); *H02M 2001/0025* (2013.01); *Y02B 70/1425* (2013.01); *Y02B 70/1433* (2013.01)

(56) References Cited

U.S. PATENT DOCUMENTS

| | | | |
|---|---|---|---|
| 2011/0169469 A1 | 7/2011 | Li et al. | |
| 2012/0248998 A1* | 10/2012 | Yoshinaga | H05B 33/0815 315/193 |
| 2013/0094250 A1* | 4/2013 | Weger | H02M 3/33523 363/21.02 |
| 2013/0156459 A1* | 6/2013 | Kawakatsu | H02M 1/10 399/88 |
| 2014/0133200 A1* | 5/2014 | Sun | H02M 1/34 363/50 |
| 2014/0355316 A1* | 12/2014 | Wu | H02M 3/335 363/21.16 |
| 2015/0155704 A1* | 6/2015 | Kikuchi | H02M 1/32 363/21.12 |

FOREIGN PATENT DOCUMENTS

| | | |
|---|---|---|
| TW | 201249079 | 12/2012 |
| TW | 201314937 | 4/2013 |
| TW | 201320567 | 5/2013 |
| TW | M471099 | 1/2014 |

OTHER PUBLICATIONS

European search report dated Sep. 23, 2015 from corresponding No. EP 14192086.8.

* cited by examiner

CONTROL DEVICE AND CONTROL METHOD OF POWER CONVERTER AND SWITCHING POWER SUPPLY USING THE SAME

CROSS REFERENCE TO RELATED APPLICATIONS

The present application claims priority under 35 U.S.C. §119 to Chinese Patent Application No. 201410127624.X, filed on Mar. 31, 2014, the entire content of which is incorporated herein by reference.

TECHNICAL FIELD

The present disclosure relates to the field of electronic technology, and more particularly, to a control device, a control method of a power converter and a switching power supply using the control device.

BACKGROUND

In order to power various electric facilities, a switching power supply with variable output voltages, such as USB Power Delivery applications, is increasingly popular. To ensure safe and reliable operation of the switching power supply under various output voltages, it is desired that the switching power supply has different over power protection point respectively corresponding to different output voltages.

In the conventional, there are two manners for over power protection.

One manner is a traditional over power protection on a primary side, in which power information is acquired by detecting a current of the primary side. If the traditional over power protection on the primary side is applied to the switching power supply with variable output voltages, once a power protection point is set, the power protection point will be the same irrelevant of the output voltage, which does not meet the requirement that respective over power protection points are set based on respective output voltages.

Another manner is an over current protection on a secondary side, in which, power information is acquired by detecting an output current. If the over current protection on the secondary side is applied to the switching power supply providing variable output voltages, the requirement that respective over power protection points are set based on respective output voltages may be satisfied; however, there still are at least two drawbacks: (1) it lacks flexibility, since corresponding over power protection point will be restricted by different output voltages once the over current protection point on the secondary side is set; (2) a sampling resistor is applied to the over current protection on the secondary side to acquire current information in general, which will consume additional power compared to the over power protection on the primary side, and is a disadvantage for improving efficiency of the switching power supply.

SUMMARY

An embodiment of the present disclosure provides a control device of a power converter including a switch unit, the control device includes: a first control unit, which is coupled to the power converter to detect an output voltage of the power converter and is configured to generate a first control signal based on the output voltage; a variable resistor unit, which is connected to an output terminal of the first control unit and is configured to generate a resistance value based on the first control signal; and a second control unit, which is connected to the variable resistor unit and is configured to output a second control signal to the switch unit in order to control operations of the switch unit.

Another embodiment of the present disclosure provides a control method of a power converter including a switch unit, the control method includes: providing a first control unit, so that the first control unit detects an output voltage of the power converter and generates a first control signal based on the output voltage; providing a variable resistor unit, so that the variable resistor unit is connected to an output terminal of the first control unit and generates a resistance value based on the first control signal; and providing a second control unit, so that the second control unit is connected to the variable resistor unit and outputs a second control signal to the switch unit in order to control operations of the switch unit.

An embodiment of the present disclosure provides a switching power supply including: a power converter configured to include a switch unit and to convert an input voltage into an output voltage; a first control unit, which is coupled to the power converter to detect an output voltage of the power converter and is configured to generate a first control signal based on the output voltage; a variable resistor unit, which is connected to an output terminal of the first control unit and is configured to generate a resistance value based on the first control signal; and a second control unit, which is connected to the variable resistor unit and to output a second control signal to the switch unit of the power converter, so that the switch unit of the power converter is operated based on the second control signal.

Another embodiment of the present disclosure provides a switching power supply including a power converter, a first control unit, a variable resistor unit and a second control unit.

The power converter includes a transformer and a switch unit. The transformer is configured to perform conversion on an input voltage of the power converter. The transformer includes: a primary winding, a first terminal thereof is connected to an external power source; and a secondary winding, a first terminal thereof outputs the output voltage, and a second terminal thereof is coupled to a second ground terminal. A first terminal of the switch unit is connected to the second terminal of the primary winding of the transformer.

The first control unit is coupled to the power converter to detect an output voltage of the power converter and generates a first control signal based on the output voltage.

The first control unit includes: an auxiliary winding at a primary side of the transformer, and a second terminal thereof is coupled to the first ground terminal; a second switch element, which is configured so that a first terminal thereof is connected to a first terminal of the auxiliary winding, and a second terminal thereof is connected to an output terminal of the first control unit, and wherein the output terminal of the first control unit is configured to output the first control signal.

The variable resistor unit is configured to be connected to the output terminal of the first control unit and to generate a resistance value based on the first control signal.

The variable resistor unit includes a first resistor branch, a second resistor branch and a first switch element. The first resistor branch includes a first resistor, which is configured so that a first terminal thereof is connected to a second terminal of the switch unit, and a second terminal thereof is connected to a first ground terminal. The second resistor branch includes a second resistor, which is configured so that a first terminal thereof is connected to the first terminal of the first resistor. The first switch element is configured so that a first terminal thereof is connected to a second terminal of the second resistor, a second terminal thereof is connected to the first ground terminal, and the control terminal thereof is connected to an output terminal of the first control unit.

A first input terminal of the second control unit is connected to a common terminal between the second resistor and the first resistor of the variable resistor unit, and an output terminal of the second control unit is connected to a control terminal of the switch unit to output a second control signal.

DETAILED DESCRIPTION

Hereinafter, embodiments of the disclosure are described in detail. It should be noted that the embodiments described herein intend to illustrate the principle of the present disclosure, rather than to limit the scope of the present disclosure.

Figure 1:
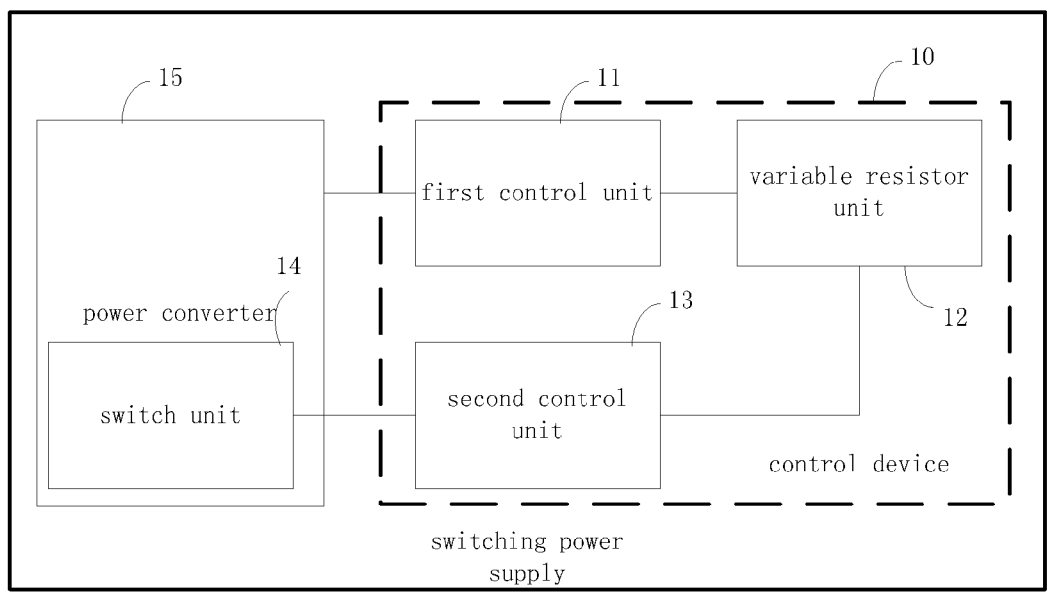
FIG. 1 is a block diagram showing a control device of a power converter according to an embodiment of the present disclosure.

FIG. 1 is a block diagram showing a control device of a power converter according to an embodiment of the present disclosure. A power converter 15 includes a switch unit 14. As illustrated in FIG. 1, a control device 10 includes a first control unit 11, a variable resistor unit 12 and a second control unit 13. The first control unit is coupled to the power converter 15 to detect an output voltage of the power converter and generates a first control signal based on the output voltage. The variable resistor unit 12 is connected to an output terminal of the first control unit 11 to receive the first control signal and generates a resistance value based on the first control signal. The second control unit 13 is connected to the variable resistor unit 12, and outputs a second control signal in order to control operations of the switch unit of the power converter.

Alternatively, the power converter 15 may be an isolated power converter, such as a flyback converter, a LLC resonant converter, a forward converter, a push-pull converter, etc. The power converter 15 may also be a non-isolated power converter, such as a boost converter, etc.

Figure 2:
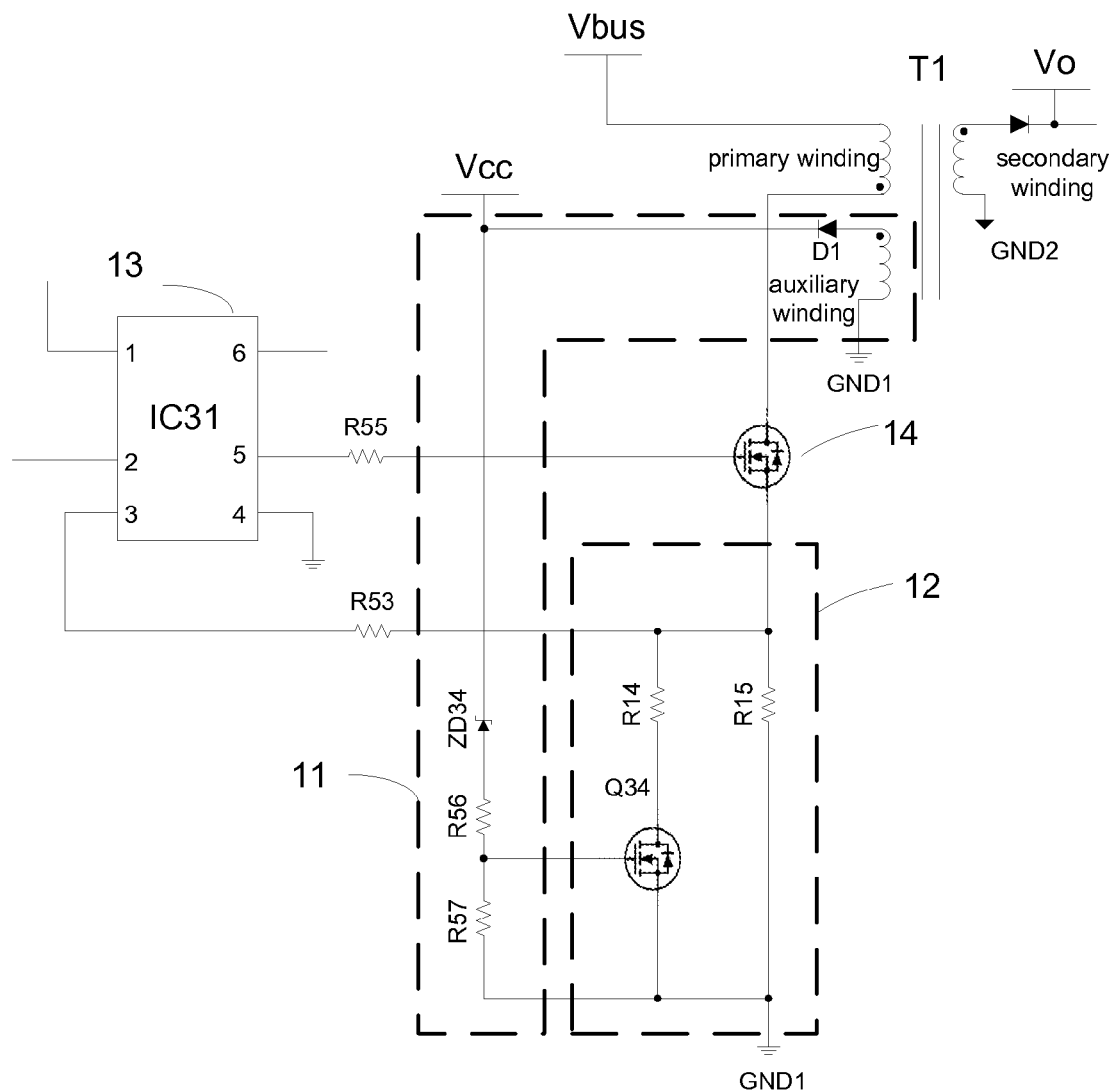
FIG. 2 is a diagram showing a specific embodiment in which a control device of the present disclosure is applied to a flyback converter.

FIG. 2 is a diagram showing one embodiment in which a control device of the present disclosure is applied to a flyback converter. As illustrated in FIG. 2, the power converter includes a transformer T1 and a switch unit 14.

The transformer T1 is configured to convert an input voltage to an output voltage of the power converter. The transformer T1 includes: a primary winding, of which a first terminal is connected to an external power source Vbus to receive a first input voltage; and a secondary winding, of which a first terminal outputs an output voltage Vo of the power converter, and a second terminal is coupled to a second ground terminal GND2.

A first terminal of the switch unit 14 is connected to a second terminal of the primary winding of the transformer T1; a second terminal of the switch unit 14 is connected to a first terminal of the variable resistor unit 12; a control terminal of the switch unit 14 is connected to an output terminal of the second control unit 13, so the switch unit 14 operates based on the second control signal, and a second terminal of the variable resistor unit 12 is connected to a first ground terminal GND1.

The first control unit 11 includes an output voltage detecting unit and a second switch element. Alternatively, as illustrated in FIG. 2, the output voltage detecting unit may be an auxiliary winding, and the second switch element may be a Zener diode ZD34.

The auxiliary winding is provided at the primary side of the transformer to detect the output voltage of the power converter. A second terminal of the auxiliary winding is connected to the first ground terminal GND1. The first control unit 11 is coupled to the power converter via the auxiliary winding.

A first terminal of the second switch element ZD34 is connected to a first terminal of the auxiliary winding; a second terminal of the second switch element ZD34 is connected to the output terminal of the first control unit; and the output terminal of the first control unit is connected to the variable resistor unit 12.

Alternatively, the first control unit 11 also includes a third resistor R56 and a fourth resistor R57. A first terminal of the third resistor R56 is connected to the second terminal of the second switch element ZD34. A first terminal of the fourth resistor R57 is connected to a second terminal of the third resistor R56. A second terminal of the fourth resistor is connected to the first ground terminal GND1. A common terminal of the third resistor R56 and the fourth resistor R57 is connected to the output terminal of the first control unit which is connected to the variable resistor unit 12.

The variable resistor unit 12 may include a first resistor branch and a second resistor branch. The variable resistor unit 12 may include a first switch element Q34. A control terminal of the first switch element Q34 is configured to receive the first control signal outputted from the output terminal of the first control unit, and to be turned on or off based on the first control signal to make the variable resistor unit 12 generate a first resistance value upon the first switch element Q34 is turned on, and generate a second resistance value upon the first switch element Q34 is turned off. The first switch element Q34 may be any element which is capable of being turned on or off based on a switch control signal, such as a field effect transistor, a bipolar transistor, etc.

The first resistor branch may include a first resistor R15. A first terminal of the first resistor R15 is connected to the flyback converter, and a second terminal of the first resistor R15 is connected to the first ground terminal. For example, the first terminal of the first resistor R15 is connected to the switch unit 14 including, for example, a switch transistor which may be any element being capable of being turned on or off based on a switch control signal, such as a field effect transistor, a bipolar transistor, etc.

The second resistor branch may include a second resistor R14 and the first switch element Q34. A first terminal of the second resistor R14 is connected to the first terminal of the first resistor R15. A first terminal of the first switch element Q34 is connected to a second terminal of the second resistor R14; a second terminal of the first switch element Q34 is connected to the first ground terminal; and the control terminal of the first switch element Q34 is connected to the output terminal of the first control unit 11 to receive the first control signal.

If the first control unit 11 detects that the output voltage of the power converter is a first voltage (e.g., 5V), the second switch element ZD34 of the first control unit 11 is turned off to output the first control signal which is a low level control signal in this case. The first switch element Q34 of the variable resistor unit 12 is turned off upon receipt of the low level control signal, to open the second resistor branch, so as to make the variable resistor unit 12 generate a second resistance value, i.e., a resistance value of the first resistor R15.

If the first control unit 11 detects that the output voltage of the power converter is a second voltage (e.g., 20V), the second switch element ZD34 of the first control unit 11 is turned on to output the first control signal which is a high level control signal in this case. The first switch element Q34 of the variable resistor unit 12 is turned on upon receipt of the high level control signal, to close the second resistor branch, so as to make the variable resistor unit 12 generate a first resistance value, i.e., a resistance value obtained through connecting the first resistor R15 and the second resistor R14 in parallel.

The second control unit 13 (e.g., a control chip IC31) is connected to the variable resistor unit 12 and outputs the second control signal in order to control operations of the switch unit of the power converter. For example, a voltage signal outputting from the variable resistor unit 12 may be used as one input signal for a comparator of the second control unit 13. The second control unit 13 compares the input signal and a voltage threshold Vopp. If the input signal is less than the voltage threshold Vopp, the switch unit is in a high frequency switch state, i.e., the power converter is in a normal operation; if the voltage signal is larger than or equals to the voltage threshold Vopp, the comparator flips and the second control unit 13 outputs a switch control signal to control the switch unit of the power converter to be turned off, i.e., to realize the over power protection.

Alternatively, if the output is the first voltage (e.g., 5V), a resistance value of the variable resistor unit 12 is a resistance value of the first resistor R15. If a current value of a current flowing through the variable resistor unit 12 is a ratio of the voltage threshold Vopp to the resistance value of the resistor R15 of the variable resistor unit 12 (i.e., Vopp/R15), the comparator flips to realize the over power protection. Likewise, if the output is the second voltage (e.g., 20V), a resistance value of the variable resistor unit 12 is a resistance value obtained through connecting the first resistor R15 and the second resistor R14 in parallel, i.e., R15×R14/(R15+R14). If the current value of the current flowing through the variable resistor unit 12 is a ratio of the voltage threshold Vopp to the resistance value R15×R14/(R15+R14) of the variable resistor unit 12 (i.e., Vopp×(R15+R14)/(R15×R14)), the comparator flips to realize the over power protection. That is, if the output voltage is the first voltage, the variable resistor unit is controlled to have a relatively large resistance value, so that the voltage threshold will be reached even if the current flowing through the variable resistor unit 12 is relatively small, thereby realizing a relatively low over power protection point. If the output voltage increases to the second voltage value, the resistance value of the variable resistor unit is controlled to be decreased, so that the voltage threshold will be reached only if the current flowing through the variable resistor unit 12 is relatively large, thereby realizing a relatively high over power protection point.

Alternatively, the variable resistor unit 12 may also include more resistor branches which are similar to the second resistor branch, i.e., to be connected to the first resistor branch in parallel and include a switch element and a resistor.

Alternatively, the variable resistor unit 12 may also include more resistor branches which are similar to the first resistor branch, i.e., to be connected to the second resistor branch in parallel and include a resistor.

As illustrated in FIG. 2, the control device may also include: a sixth resistor R53, a seventh resistor R55. A first terminal of the sixth resistor R53 is connected to the first terminal of the second resistor R14; a second terminal of the sixth resistor R53 is connected to an input terminal of the second control unit 13. A first terminal of the seventh resistor R55 is connected to the output terminal of the second control unit 13; a second terminal of the seventh resistor R55 is connected to the control terminal of the switch unit 14.

As illustrated in FIG. 2, the first control unit 11 may also include a diode D1. An anode of the diode D1 is connected to the first terminal of the auxiliary winding; a cathode of the diode D1 is connected to the first terminal of the second switch element ZD34.

According to the above embodiment, the resistance value of the variable resistor unit is changeable based on the detected output voltage of the power converter, so as to realize the function of setting different over power protection points based on the output voltages of the power converter.

Figure 3:
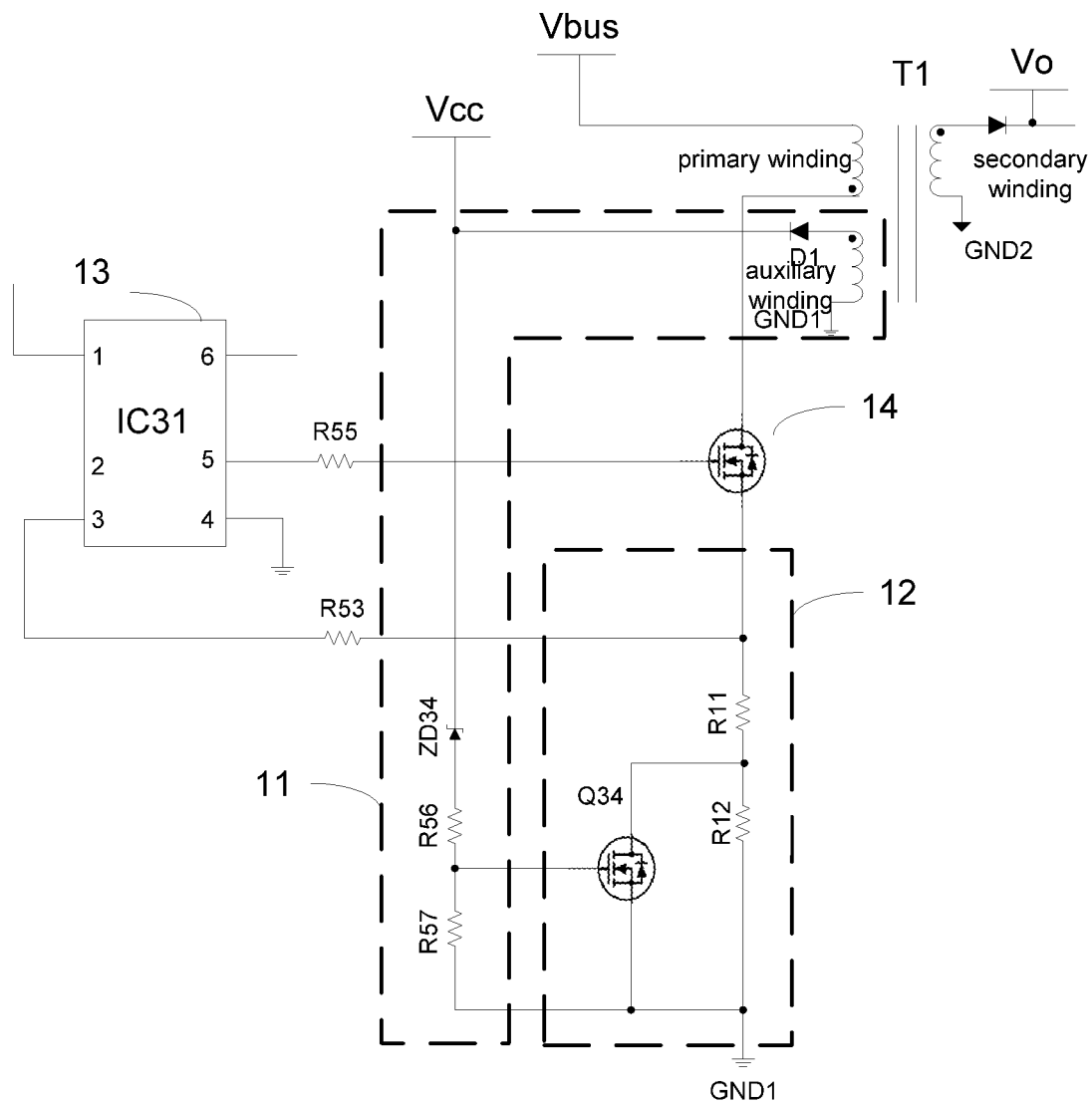
FIG. 3 is a diagram showing another specific embodiment in which a control device of the present disclosure is applied to a flyback converter.

FIG. 3 is a diagram showing another embodiment in which a control device of the present disclosure is applied to the flyback converter. As illustrated in FIG. 3, the flyback converter includes a transformer T1 and a switch unit 14. The transformer T1 and the switch unit 14 shown in FIG. 3 are respectively the same with the transformer T1 and the switch unit 14 illustrated in FIG. 2, and thus the description thereof will not be repeated.

As illustrated in FIG. 3, a first control unit 11 includes an output voltage detecting unit and a second switch element ZD34, of which the specific configuration is the same with that of the first control unit 11 illustrated in FIG. 2, and thus the description thereof will not be repeated.

The variable resistor unit 12 includes an eleventh resistor R11, a twelfth resistor R12 and a first switch element Q34. A first terminal of the eleventh resistor R11 is connected to the power converter. For example, the first terminal of the eleventh resistor R11 is connected to the switch unit 14 of the flyback converter. The switch unit 14 may include, for example, a switch transistor. A first terminal of the twelfth resistor R12 is connected to a second terminal of the eleventh resistor R11, and a second terminal of the twelfth resistor R12 is connected to the first ground terminal.

The first terminal of the first switch element Q34 is connected to a common terminal of the twelfth resistor R12 and the eleventh resistor R11; the second terminal of the first switch element Q34 is connected to the first ground terminal; and the control terminal of the first switch element Q34 is connected to the output terminal of the first control unit 11 to receive the first control signal.

If the first control unit 11 detects that the output voltage of the power converter is a first voltage (e.g., 5V), the second switch element ZD34 of the first control unit 11 is turned off to output the first control signal which is a low level control signal in this case. The first switch element Q34 of the variable resistor unit 12 is turned off upon receipt of the low level control signal, so as to make the variable resistor unit 12 generate a second resistance value, i.e., a resistance value obtained through connecting the eleventh resistor R11 and the twelfth resistor R12 in series.

If the first control unit 11 detects that the output voltage of the power converter is a second voltage (e.g., 20V), the second switch element ZD34 of the first control unit 11 is turned on to output the first control signal which is a high level control signal in this case. The first switch element Q34 of the variable resistor unit 12 is turned on upon receipt of the high level control signal to bypass the second resistor branch, so as to make the variable resistor unit 12 generate a first resistance value, i.e., a resistance value of the eleventh resistor R11.

The second control unit 13 (e.g., a control chip IC31) is connected to the variable resistor unit 12 and outputs the second control signal in order to control operations of the switch unit 14 of the power converter. The principle for realizing the function of setting different over power protection points based on the output voltages of the power converter is the same with that of the embodiment shown in FIG. 2, and thus the description thereof will not be repeated.

Figure 4:
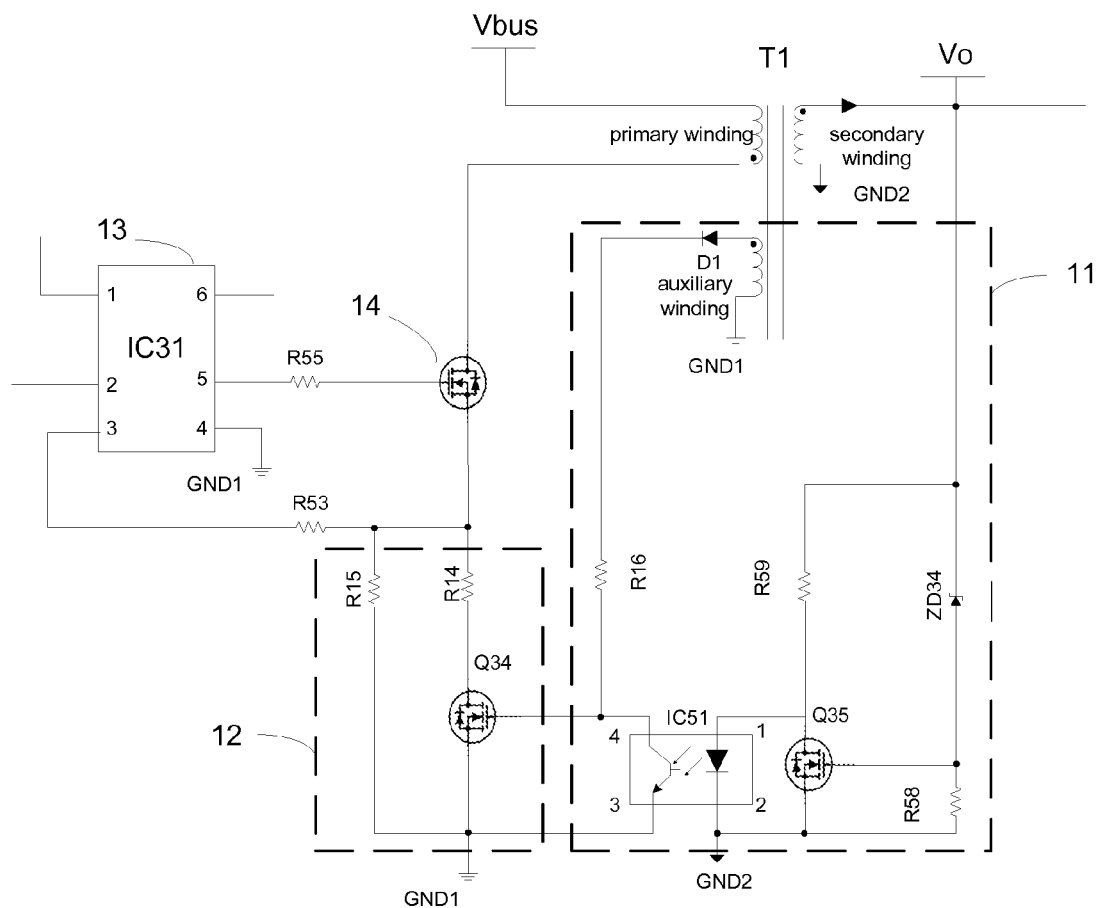
FIG. 4 is a diagram showing another specific embodiment in which a control device of the present disclosure is applied to a flyback converter.

In the present disclosure, the output voltage of the power converter may be sampled through utilizing the auxiliary winding at the primary side, or may be directly sampled at the output side of the power converter. FIG. 4 is a diagram showing another embodiment in which a control device of the present disclosure is applied to a flyback converter. As illustrated in FIG. 4, the first control unit 11 may include the auxiliary winding, the second switch element ZD34, an eighth resistor R58, a third switch element Q35, a ninth resistor R59, a fifth resistor R16 and an isolator.

Alternatively, the second switch element may be a Zener diode ZD34; the third switch element may be a switch transistor, such as a field effect transistor, a bipolar transistor, etc., and the isolator may be an optical coupler IC51.

The second terminal of the auxiliary winding is connected to the first ground terminal. The first terminal of the second switch element ZD34 is connected to the output side of the power converter and is cooperated with other elements to detect the output voltage of the power converter. That is, the first control unit 11 is electrically coupled to the power converter to detect the output voltage of the power converter.

A first terminal of the eighth resistor R58 is connected to the second terminal of the second switch element ZD34; a second terminal of the eighth resistor R58 is connected to the second ground terminal. A control terminal of the third switch element Q35 is connected to a common terminal of the eighth resistor and the second switch element; a second terminal of the third switch element Q35 is connected to the second ground terminal. A first terminal of the ninth resistor is connected to the first terminal of the second switch element ZD34; a second terminal of the ninth resistor is connected to a first terminal of the third switch element Q35.

A first input terminal of the isolator IC51 is connected to a common terminal of the first terminal of the third switch element Q35 and the ninth resistor R59; a second input terminal of the isolator IC51 is coupled to the second ground terminal; a first output terminal of the isolator IC51 is connected to the variable resistor unit 12 to output the first control signal; and, a second output terminal of the isolator IC51 is coupled to the first ground terminal.

A first terminal of the fifth resistor R16 is connected to the first terminal of the auxiliary winding; a second terminal of the fifth resistor R16 is connected to the first output terminal of the isolator IC51.

The variable resistor unit 12 of FIG. 4 may be the same with that of FIG. 2, and thus the description thereof will not be repeated.

If the first control unit 11 detects that the output voltage of the power converter is a first voltage (e.g., 5V), the second switch element ZD34 of the first control unit 11 is turned off to make the third switch element Q35 be turned off, so as to output the first control signal which is a low level control signal in this case. The first switch element Q34 of the variable resistor unit 12 is turned off upon receipt of the low level control signal to open the second resistor branch, so as to make the variable resistor unit 12 generate the second resistance value, i.e., a resistance value of the first resistor R15.

If the first control unit 11 detects that the output voltage of the power converter is a second voltage (e.g., 20V), the second switch element ZD34 of the first control unit 11 is turned on to make Q35 be turned on, so as to output the first control signal which is a high level control signal in this case. The first switch element Q34 of the variable resistor unit 12 is turned on upon receipt of the high level control signal to close the second resistor branch, so as to make the variable resistor unit 12 generate the first resistance value, i.e., a resistance value obtained through connecting the first resistor R15 and the second resistor R14 in parallel.

The second control unit 13 (e.g., a control chip IC31) is connected to the variable resistor unit 12 and outputs the second control signal in order to control operations of the switch unit 14 of the power converter. The principle for realizing the function of setting different over power protection points based on the output voltages of the power converter is the same with that of the embodiment shown in FIG. 2, and thus the description thereof will not be repeated.

Figure 5:
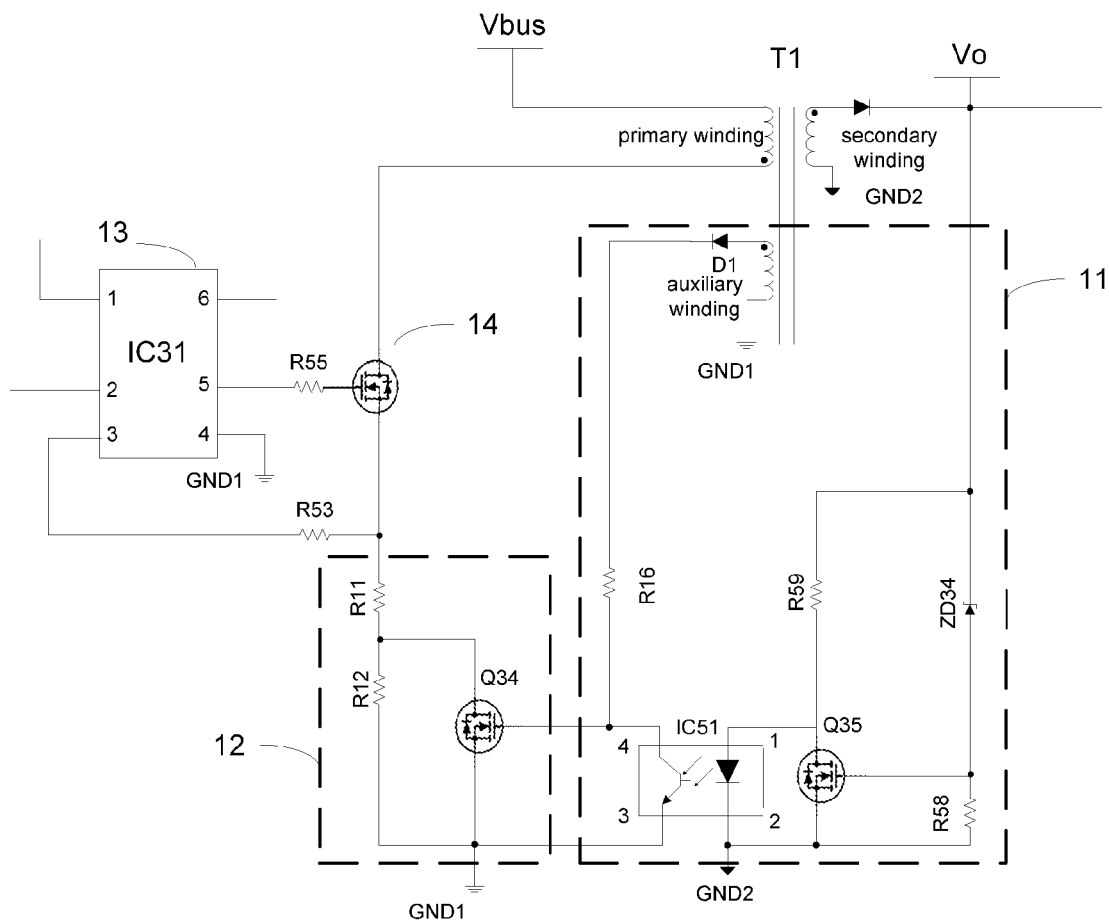
FIG. 5 is a diagram showing another specific embodiment in which a control device of the present disclosure is applied to a flyback converter.
Figure 6:
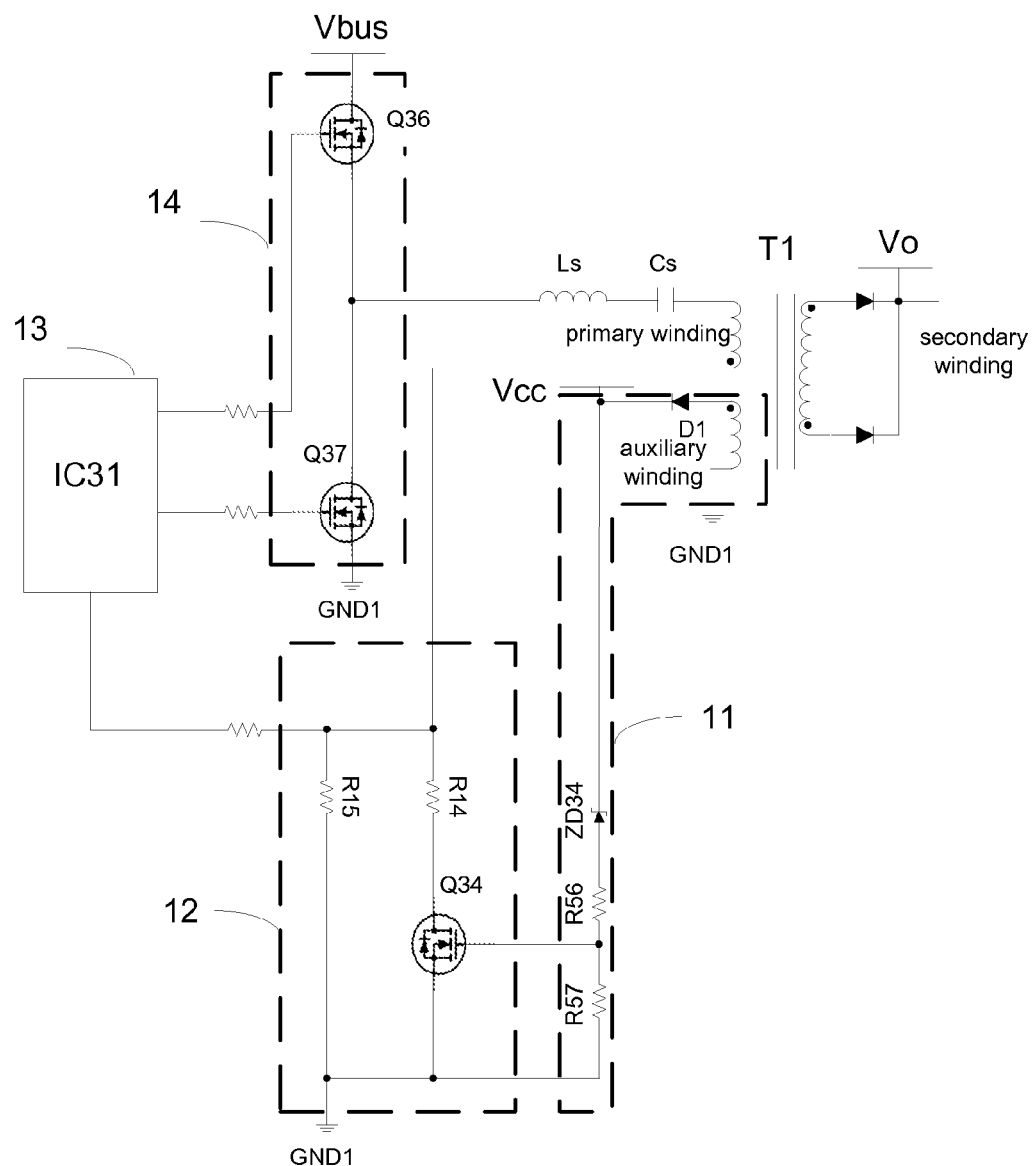
FIG. 6 is a diagram showing a specific embodiment in which a control device of the present disclosure is applied to a LLC converter.

FIG. 5 is a diagram showing another embodiment in which a control device of the present disclosure is applied to a flyback converter. The first control unit 11 shown in FIG. 5 may be the same with that shown in FIG. 4, and thus the description thereof will not be repeated. The variable resistor unit 12 shown in FIG. 5 may be the same with that shown in FIG. 3, and thus the description thereof will not be repeated FIG. 6 is a diagram showing an embodiment in which a control device of the present disclosure is applied to a LLC converter. As illustrated in FIG. 6, the first control unit 11, the variable resistor unit 12 and the second control unit 13 are respectively the same with those shown in FIG. 2, and thus the description thereof will not be repeated.

The switching power supply as shown in FIG. 6 also includes an inductor Ls and a capacitor Cs. A first terminal of the inductor Ls is connected to the switch unit 14; a second terminal of the inductor Ls is connected to a first terminal of the capacitor Cs; a second terminal of the capacitor Cs is connected to the primary winding of the transformer T1. The switch unit 14 may include: a first switch transistor Q36, of which a first terminal is connected to an external power supply source of the switching power supply, and a control terminal is connected to the output terminal of the second control unit 13; a second switch transistor Q37, of which a first terminal is connected to a second terminal of the first switch transistor Q36, a second terminal is connected to the first ground terminal, and a control terminal is connected to the output terminal of the second control unit 13. A common terminal of the second terminal of the first switch transistor Q36 and the first terminal of the second switch transistor Q37 is connected to the first terminal of the inductor Ls.

Figure 7:
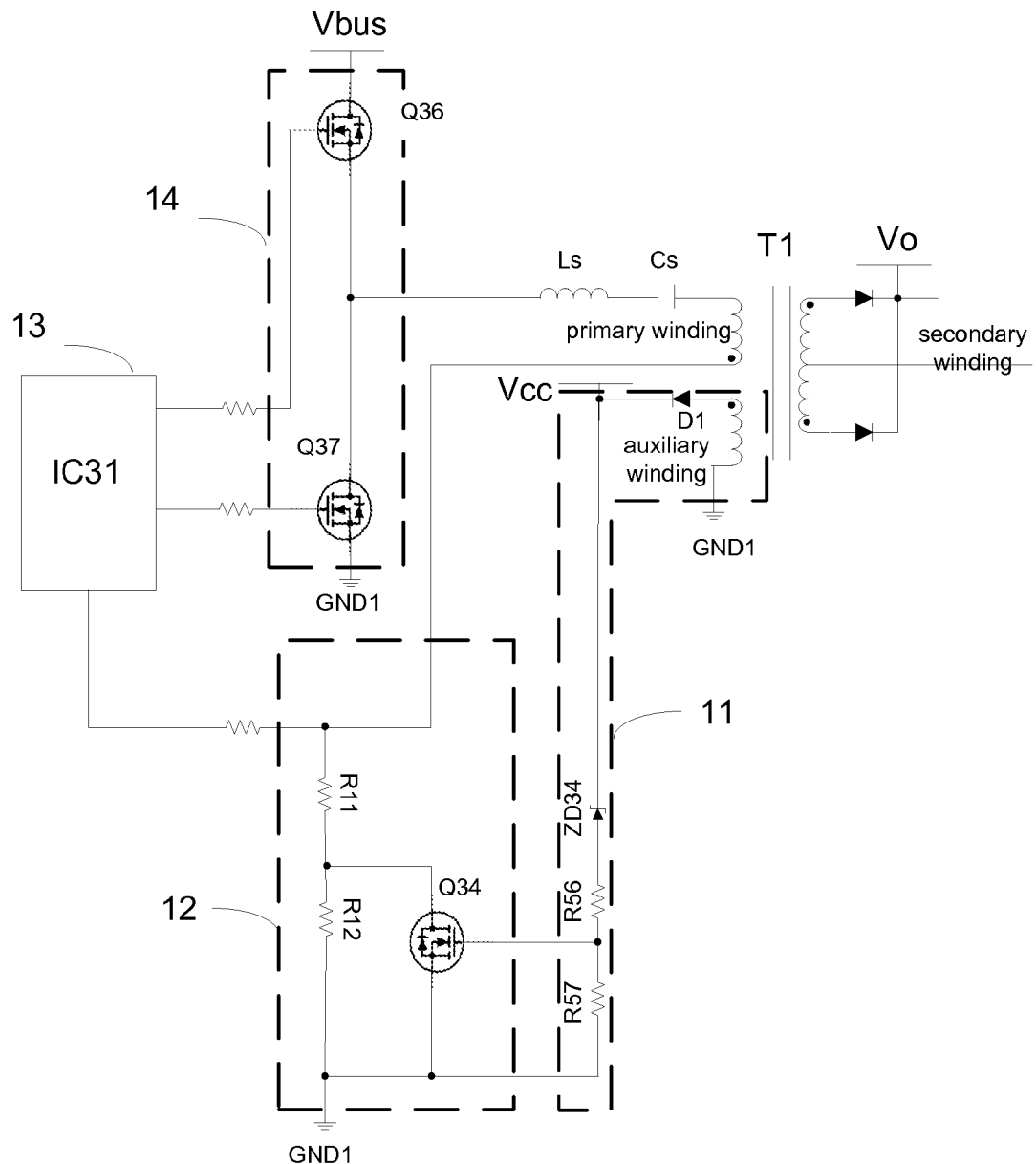
FIG. 7 is a diagram showing another specific embodiment in which a control device of the present disclosure is applied to a LLC converter.

FIG. 7 is a diagram showing another embodiment in which a control device of the present disclosure is applied to a LLC converter. As illustrated in FIG. 7, a first control unit 11, a variable resistor unit 12 and a second control unit 13 are respectively the same with those shown in FIG. 3, and thus the description thereof will not be repeated. The switching power supply as shown in FIG. 7 also includes an inductor Ls, a capacitor Cs and the switch unit 14 which are respectively the same with those shown in FIG. 6, and thus the description thereof will not be repeated.

Figure 8:
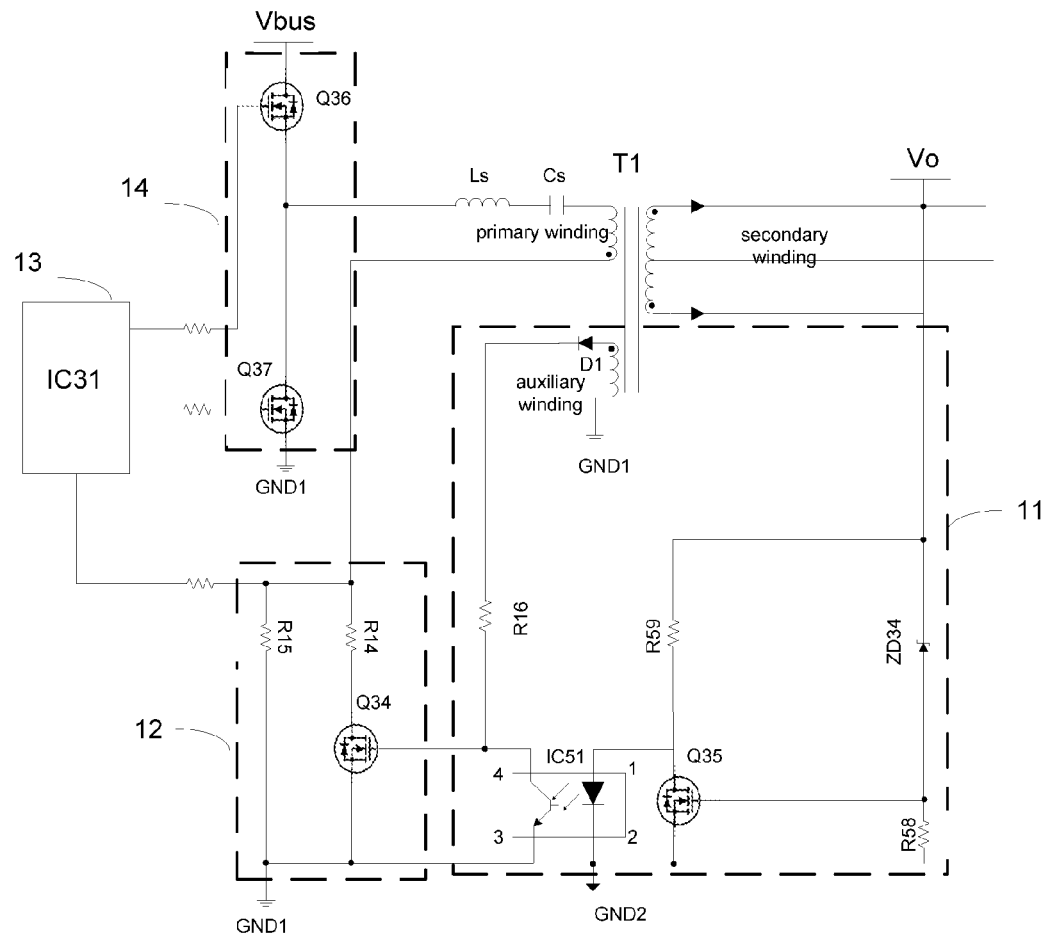
FIG. 8 is a diagram showing another specific embodiment in which a control device of the present disclosure is applied to a LLC converter.

FIG. 8 is a diagram showing another embodiment in which a control device of the present disclosure is applied to a LLC converter. As illustrated in FIG. 8, a first control unit 11, a variable resistor unit 12 and a second control unit 13 are respectively the same with those shown in FIG. 4, and thus the description thereof will not be repeated. The switching power supply as shown in FIG. 8 also includes an inductor Ls, a capacitor Cs and the switch unit 14 which are respectively the same with those shown in FIG. 6, and thus the description thereof will not be repeated.

Figure 9:
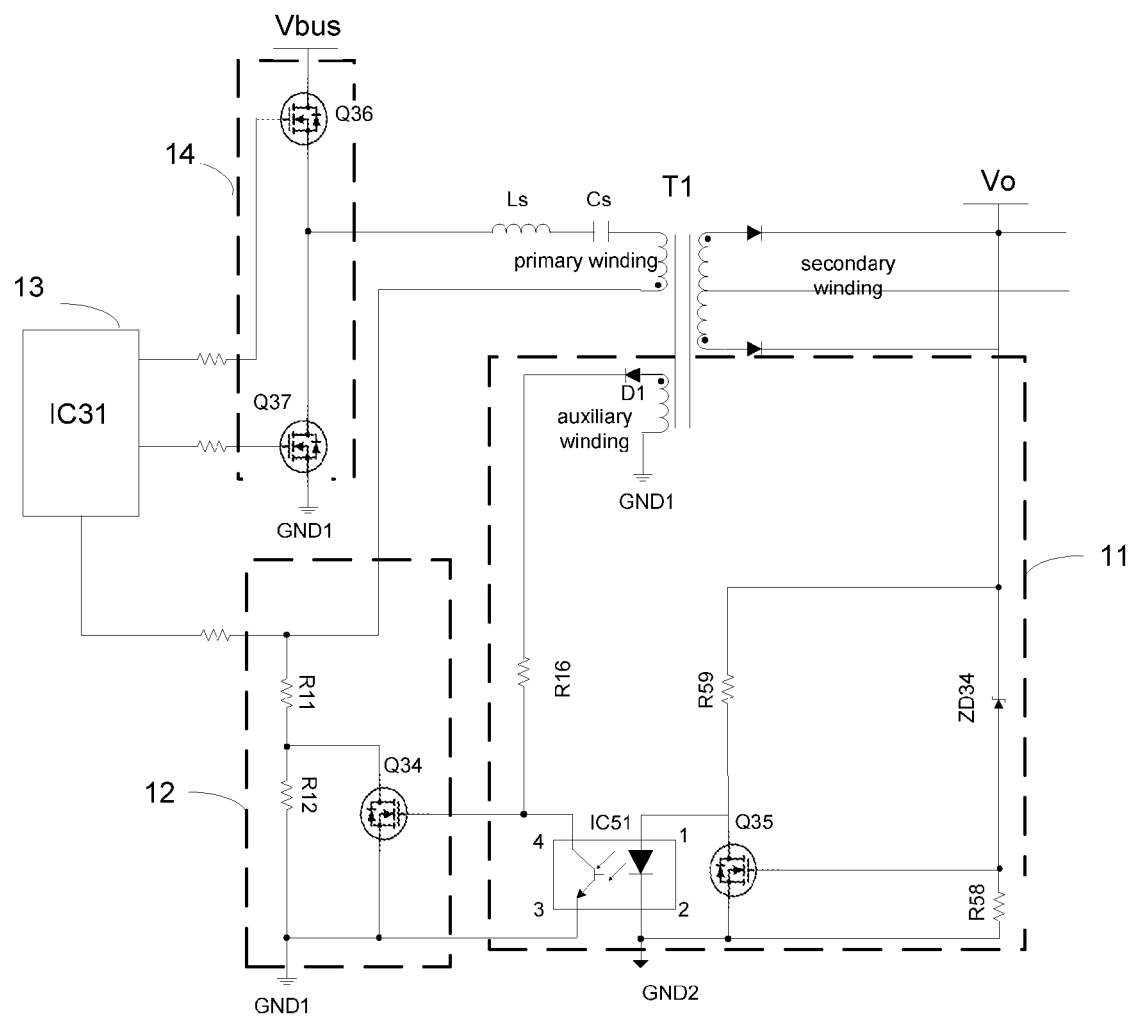
FIG. 9 is a diagram showing another specific embodiment in which a control device of the present disclosure is applied to a LLC converter.

FIG. 9 is a diagram showing another embodiment in which a control device of the present disclosure is applied to a LLC converter. As illustrated in FIG. 9, a first control unit 11, a variable resistor unit 12 and a second control unit 13 are respectively the same with those shown in FIG. 5, and thus the description thereof will not be repeated. The switching power supply as shown in FIG. 9 also includes an inductor Ls, a capacitor Cs and the switch unit 14 which are respectively the same with those shown in FIG. 6, and thus the description thereof will not be repeated.

In FIGS. 5-9, the principle for realizing the function of setting different over power protection points based on the output voltages of the power converter is the same with that of the embodiment shown in FIG. 2, and thus the description thereof will not be repeated.

Figure 10:
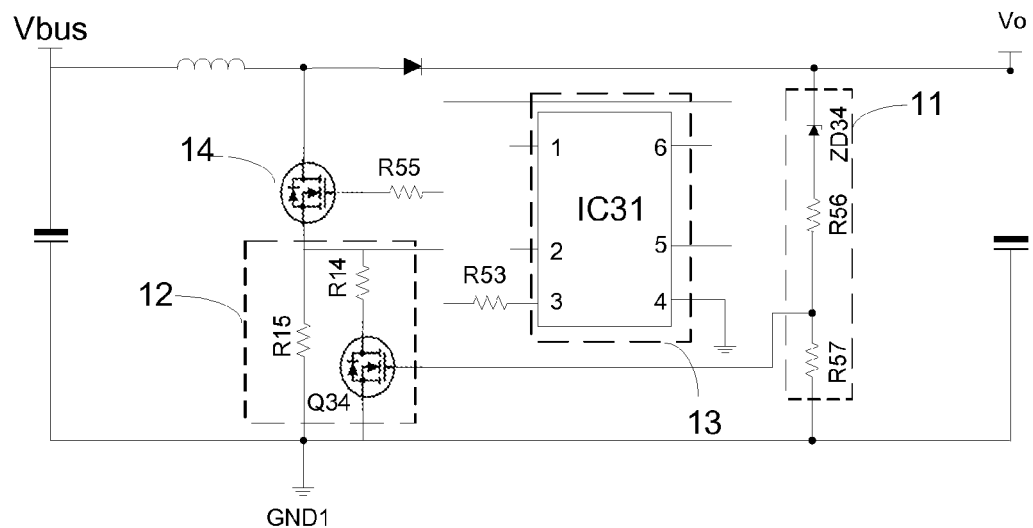
FIG. 10 is a diagram showing a specific embodiment in which a control device of the present disclosure is applied to a boost converter.

Alternatively, the power converter may be a non-isolated power converter. FIG. 10 is a diagram showing a specific embodiment in which a control device of the present disclosure is applied to a boost converter. A first control unit 11 is coupled to an output capacitor to detect an output voltage of a boost circuit, and generates the first control signal based on the detected output voltage. The variable resistor unit 12 is connected to the output terminal of the first control unit 11 to receive the first control signal, and generates a resistance value based on the first control signal. The second control unit 13 is connected to the variable resistor unit 12 and to output a second control signal in order to control operations of the switch unit of the boost circuit.

The first control unit 11 may include a second switch element ZD34, a third resistor R56 and a fourth resistor R57. A first terminal of the second switch element ZD34 is connected to the output capacitor. A first terminal of the third resistor R56 is connected to the second terminal of the second switch element ZD34. A first terminal of the fourth resistor R57 is connected to a second terminal of the third resistor R56; and a second terminal of the fourth resistor R57 is connected to the first ground terminal. A common terminal of the third resistor R56 and the fourth resistor R57 is connected to the variable resistor unit 12.

The variable resistor unit 12 may be the same with that shown in FIG. 2, and thus the description thereof will not be repeated.

Alternatively, the variable resistor unit 12 may be the same with that shown in FIG. 3, and thus the description thereof will not be repeated. The principle for realizing the function of setting different over power protection points based on the output voltages of the power converter is the same with that of the embodiment shown in FIG. 2, and thus the description thereof will not be repeated.

Figure 11:
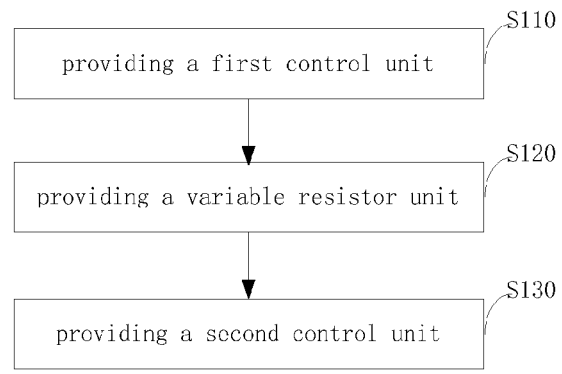
FIG. 11 is a diagram showing a control method of a power converter according to an embodiment of the present disclosure.

FIG. 11 is a diagram showing a control method for a power converter according to an embodiment of the present disclosure. As illustrated in FIG. 11, in S110, the first control unit is provided, and the first control unit is configured to detect an output voltage of the power converter and generate a first control signal based on the output voltage. In S120, a variable resistor unit is provided, and the variable resistor unit is configured to receive the first control signal and generate a resistance value based on the first control signal. In S130, the second control unit is provided, and the second control unit is configured to be connected to the variable resistor unit and to output a second control signal in order to control operations of the switch unit of the power converter.

For example, as illustrated in FIGS. 1-10, in S110, the first control unit 11, which is configured to detect an output voltage of the power converter and generate the first control signal based on the output voltage, is provided. In S120, the variable resistor unit 12, which is configured to receive the first control signal and generate a resistance value based on the first control signal, is provided. In S130, the second control unit 13, which is connected to the variable resistor unit and is configured to output the second control signal in order to control operations of the switch unit of the power converter, is provided.

Alternatively, as illustrated in FIGS. 2, 4, 6, 8 and 10, the variable resistor unit 12 may include a first resistor branch and a second resistor branch. The second resistor branch includes a second resistor R14 and a first switch element Q34 connected in series. The first resistor branch and the second resistor branch are connected in parallel. A control terminal of the first switch element Q34 is connected to an output terminal of the first control unit 11 so as to receive the first output control signal.

In S110, if the first control unit 11 detects that the output voltage of the power converter is a first voltage (e.g., 5V), the second switch element ZD34 of the first control unit 11 is turned off to output the first control signal which is a low level control signal in this case. Since the first control signal is a low level control signal at that time, in S120, the first switch element Q34 is turned off to open the second resistor branch, so as to make the variable resistor unit 12 generate the second resistance value, i.e., a resistance value of the first resistor R15.

In S110, if the first control unit 11 detects that the output voltage of the power converter is a second voltage (e.g., 20V), the second switch element ZD34 of the first control unit 11 is turned on to output the first control signal which is a high level control signal in this case. Since the first control signal is a high level control signal at that time, in S120, the first switch element Q34 is turned on to close the second resistor branch, so as to make the variable resistor unit 12 generate the first resistance value, i.e., a resistance value obtained through connecting the first resistor R15 and the second resistor R14 in parallel.

Alternatively, as illustrated in FIGS. 3, 5, 7, 9 and 10, the variable resistor unit 12 may include: an eleventh resistor R11, a twelfth resistor R12 and a first switch element Q34 which is connected in parallel to the twelfth resistor R12. The first terminal of the first switch element Q34 is connected to the common terminal of the eleventh resistor R11 and the twelfth resistor R12. The second terminal of the first switch element Q34 is connected to the first ground terminal. The control terminal of the first switch element Q34 is connected to the first control unit 11 to receive the first control signal.

In S110, if the first control unit 11 detects that the output voltage of the power converter is a first voltage (e.g., 5V), the second switch element ZD34 of the first control unit 11 is turned off to output the first control signal which is a low level control signal in this case. Since the first control signal is a low level control signal at that time, in S120, the first switch element Q34 is turned off, so as to make the variable resistor unit 12 generate the second resistance value, i.e., a resistance value obtained through connecting the eleventh resistor R11 and the twelfth resistor R12 in series.

In S110, if the first control unit 11 detects that the output voltage of the power converter is a second voltage (e.g., 20V), the second switch element ZD34 of the first control unit 11 is turned on to output the first control signal which is a high level control signal in this case. Since the first control signal is a high level control signal at that time, in S120, the first switch element Q34 is turned on to bypass the second resistor branch, so as to make the variable resistor unit 12 generate the first resistance value, i.e., a resistance value of the eleventh resistor R11.

Alternatively, as illustrated in FIG. 1, a switching power supply is constituted of the power converter 15 and the control device 10. The control device 10 includes the first control unit 11, the variable resistor unit 12 and the second control unit 13.

The power converter 15 includes the switch unit 14 configured to convert an input voltage into an output voltage. The first control unit 11 is coupled to the power converter to detect an output voltage of the power converter 15 and generates the first control signal based on the output voltage. The variable resistor unit 12 is connected to the first control unit 11 to receive the first control signal and generates a resistance value based on the first control signal. The second control unit 13 is connected to the variable resistor unit 12 to output the second control signal to the switch unit 14 of the power converter 15, such that the switch unit 14 of the power converter 15 operates based on the second control signal output from the second control unit.

Alternatively, the power converter may be a flyback converter, as illustrated in FIGS. 2-5. Alternatively, the power converter may be a LLC converter, as illustrated in FIGS. 6-9. Alternatively, the power converter may be a non-insulated converter, such as a boost converter illustrated in FIG. 10.

In the above embodiments, the output voltage of the power converter is detected directly at the output side of the power converter or by utilizing the auxiliary winding of the transformer. In practice, the output voltage may be detected by other ways depending on the engineering needs.

Although the present disclosure has been described in detail with reference to the above exemplary embodiments, the scope of the present disclosure is not limited thereto. Various modifications and variations may be done to the present disclosure without departing from the scope and idea of the present disclosure by those skilled in the art.

What is claimed is:

1. A control device of a power converter, wherein the power converter comprises a switch unit, wherein the control device comprises:
   a first control unit, which is coupled to the power converter to detect an output voltage of the power converter and is configured to generate a first control signal based on the output voltage;
   a variable resistor unit, which is connected to an output terminal of the first control unit and is configured to generate a resistance value based on the first control signal; and
   a second control unit, which is connected to the variable resistor unit and is configured to output a second control signal to the switch unit in order to control operations of the switch unit,
   wherein the power converter further comprises a transformer, a first terminal of the variable resistor unit is connected to a primary winding of the transformer, and a second terminal of the variable resistor unit is connected to a first ground terminal.

2. The control device according to claim 1, wherein the power converter is a flyback converter, a LLC resonant converter, a forward converter or a push-pull converter.

3. The control device according to claim 1, wherein the variable resistor unit comprises:
   a first switch element configured so that a control terminal thereof receives the first control signal, and the first switch element is configured to be turned on or off based on the first control signal, so as to make the variable resistor unit generate a first resistance value if the first switch element is turned on and generate a second resistance value if the first switch element is turned off.

4. The control device according to claim 3, wherein the variable resistor unit comprises:
   a first resistor branch comprising:
      a first resistor configured so that a first terminal thereof is connected to the power converter, and a second terminal thereof is connected to the first ground terminal; and
   a second resistor branch comprising:
      a second resistor configured so that a first terminal thereof is connected to the first terminal of the first resistor; and
      the first switch element configured so that a first terminal thereof is connected to a second terminal of the second resistor, a second terminal thereof is connected to the first ground terminal, and the control terminal thereof is connected to the output terminal of the first control unit.

5. The control device according to claim 3, wherein the variable resistor unit comprises:
   an eleventh resistor, which is configured so that a first terminal thereof is connected to the power converter;
   a twelfth resistor, which is configured so that a first terminal thereof is connected to a second terminal of the eleventh resistor, and a second terminal thereof is connected to the first ground terminal; and
   the first switch element, which is configured so that a first terminal thereof is connected to a common terminal of the eleventh resistor and the twelfth resistor, a second terminal thereof is connected to the first ground terminal, and the control terminal thereof is connected to the output terminal of the first control unit.

6. The control device according to claim 1, wherein the first control unit comprises:
   an output voltage detecting unit coupled to the power converter; and
   a second switch element, which is configured so that a first terminal thereof is connected to the output voltage detecting unit, and a second terminal thereof is connected to the output terminal of the first control unit.

7. The control device according to claim 1, wherein the first control unit comprises:
   an auxiliary winding, which is configured so that a second terminal thereof is coupled to a first ground terminal;
   a second switch element, which is configured so that a first terminal thereof is connected to an output side of the power converter;
   an eighth resistor, which is configured so that a first terminal thereof is coupled to a second terminal of the second switch element, and a second terminal thereof is coupled to a second ground terminal;
   a third switch element, which is configured so that a control terminal thereof is connected to a common terminal of the eighth resistor and the second switch element, and a second terminal thereof is coupled to the second ground terminal;
   a ninth resistor, which is configured so that a first terminal thereof is connected to the first terminal of the second switch element, and a second terminal thereof is connected to a first terminal of the third switch element;
   an isolator, which is configured so that a first input terminal thereof is connected to a common terminal of the first terminal of the third switch element and the ninth resistor, a second input terminal thereof is coupled to the second ground terminal, a first output terminal thereof is connected to the variable resistor unit, and a second output terminal thereof is coupled to the first ground terminal; and
   a fifth resistor configured so that a first terminal thereof is connected to a first terminal of the auxiliary winding, a second terminal thereof is connected to the first output terminal of the isolator.

8. A control method of a power converter, wherein the power converter comprises a switch unit and a transformer, and the control method comprises:
   providing a first control unit, so that the first control unit is coupled to the power converter to detect an output voltage of the power converter and generates a first control signal based on the output voltage;
   providing a variable resistor unit, so that the variable resistor unit is connected to an output terminal of the first control unit and generates a resistance value based on the first control signal; and
   providing a second control unit, so that the second control unit is connected to the variable resistor unit and outputs a second control signal to the switch unit in order to control operations of the switch unit,
   wherein a first terminal of the switch unit is connected to a primary winding of the transformer, a second terminal of the switch unit is connected to the variable resistor unit, and a control terminal of the switch unit is connected to an output terminal of the second control unit.

9. The control method according to claim 8, wherein the variable resistor unit comprises: a first resistor branch comprising a first resistor, and a second resistor branch comprising a second resistor and a first switch element connected to each other in series, wherein the first resistor branch is connected in parallel with the second resistor branch, and a control terminal of the first switch element is connected to the first control unit;
   generating, by the first control unit, the first control signal based on the output voltage comprises:
      outputting, by the first control unit, the first control signal if the first control unit detects that the output voltage of the power converter is a first voltage, wherein the first control signal is a low level control signal in this case; and
      outputting, by the first control unit, the first control signal if the first control unit detects that the output voltage of the power converter is a second voltage, wherein the first control signal is a high level control signal in this case;
   generating, by the variable resistor unit, the resistance value based on the first control signal comprises:
      turning the first switch element on if the first control signal is at the high level, so as to make the variable resistor unit generate a first resistance value; and
      turning the first switch element off if the first control signal is at the low level, so as to make the variable resistor unit generate a second resistance value.

10. The control method according to claim 8, wherein the variable resistor unit comprises: an eleventh resistor, a twelfth resistor, and a first switch element connected in parallel to the twelfth resistor, wherein a first terminal of the first switch element is connected to a common terminal of the eleventh resistor and the twelfth resistor, a second terminal of the first switch element is connected to a first ground terminal, and a control terminal of the first switch element is connected to the first control unit;
   generating, by the first control unit, the first control signal based on the output voltage comprises:
      outputting, by the first control unit, the first control signal if the first control unit detects that the output voltage of the power converter is a first voltage, wherein the first control signal is a low level control signal in this case; and
      outputting, by the first control unit, the first control signal if the first control unit detects that the output voltage of the power converter is a second voltage, wherein the first control signal is a high level control signal in this case;
   generating, by the variable resistor unit, the resistance value based on the first control signal comprises:
      turning the first switch element on if the first control signal is at the high level, so as to make the variable resistor unit generate a first resistance value; and
      turning the first switch element off if the first control signal is at the low level, so as to make the variable resistor unit generate a second resistance value.

11. A switching power supply, comprising:
   a power converter configured to comprise a switch unit and to convert an input voltage into an output voltage;
   a first control unit, which is coupled to the power converter to detect the output voltage of the power converter and is configured to generate a first control signal based on the output voltage;
   a variable resistor unit, which is connected to an output terminal of the first control unit and is configured to generate a resistance value based on the first control signal; and a second control unit, which is connected to the variable resistor unit to output a second control signal to the switch unit of the power converter, so that the switch unit of the power converter is operated based on the second control signal, wherein the power converter further comprises a transformer, and wherein a first terminal of the switch unit is connected to a primary winding of the transformer, a second terminal of the switch unit is connected to the variable resistor unit, and a control terminal of the switch unit is connected to an output terminal of the second control unit.

12. The switching power supply according to claim 11, wherein the first control unit comprises:
an auxiliary winding configured to be provided at a primary side of the transformer, wherein a second terminal of the auxiliary winding is connected to the first ground terminal;
a second switch element, which is configured so that a first terminal thereof is connected to a first terminal of the auxiliary winding, and a second terminal thereof is connected to the output terminal of the first control unit.

13. The switching power supply according to claim 11, wherein the first control unit comprises:
an auxiliary winding, which is configured so that a second terminal thereof is coupled to the first ground terminal;
a second switch element, which is configured so that a first terminal thereof is connected to an output side of the power converter;
an eighth resistor, which is configured so that a first terminal thereof is connected to a second terminal of the second switch element, and a second terminal thereof is coupled to a second ground terminal;
a third switch element, which is configured so that a control terminal thereof is connected to a common terminal of the eighth resistor and the second switch element, and a second terminal thereof is coupled to the second ground terminal;
a ninth resistor, which is configured so that a first terminal thereof is connected to the first terminal of the second switch element, and a second terminal thereof is connected to a first terminal of the third switch element;
an isolator, which is configured so that a first input terminal thereof is connected to a common terminal of the first terminal of the third switch element and the ninth resistor, a second input terminal thereof is coupled to the second ground terminal, a first output terminal thereof is connected to the variable resistor unit, and a second output terminal thereof is coupled to the first ground terminal; and
a fifth resistor, which is configured so that a first terminal thereof is connected to a first terminal of the auxiliary winding, and a second terminal thereof is connected to the first output terminal of the isolator.

14. The switching power supply according to claim 11, wherein the variable resistor unit comprises:
a first switch element, which is configured so that a control terminal thereof receives the first control signal, and the first switch element is configured to be turned on or off based on the first control signal to make the variable resistor unit generate a first resistance value if the first switch element is turned on and generate a second resistance value if the first switch element is turned off.

15. The switching power supply according to claim 14, wherein the variable resistor unit comprises:
a first resistor branch comprising:
a first resistor, which is configured so that a first terminal thereof is connected to the power converter, and a second terminal thereof is connected to a first ground terminal;
a second resistor branch comprising:
a second resistor, which is configured so that a first terminal thereof is connected to the first terminal of the first resistor; and
the first switch element, which is configured so that a first terminal thereof is connected to a second terminal of the second resistor, a second terminal thereof is connected to the first ground terminal, and the control terminal thereof is connected to an output terminal of the first control unit.

16. The switching power supply according to claim 14, wherein the variable resistor unit comprises:
an eleventh resistor, which is configured so that a first terminal thereof is connected to the power converter;
a twelfth resistor, which is configured so that a first terminal thereof is connected to a second terminal of the eleventh resistor, and a second terminal thereof is connected to the first ground terminal, and
the first switch element, which is configured so that a first terminal thereof is connected to a common terminal of the eleventh resistor and the twelfth resistor, a second terminal thereof is connected to the first ground terminal, and the control terminal thereof is connected to the output terminal of the first control unit.

17. The switching power supply according to claim 11, wherein the power converter further comprises:
a transformer;
a capacitor, which is configured so that a second terminal thereof is connected to the primary winding of the transformer; and
an inductor, which is configured so that a second terminal thereof is connected to a first terminal of the capacitor;
wherein the switch unit comprises:
a first switch transistor, which is configured so that a first terminal thereof is connected to an input voltage of the switching power supply, a control terminal thereof is connected to an output terminal of the second control unit; and
a second switch transistor, which is configured so that a first terminal thereof is connected to a second terminal of the first switch transistor, a second terminal thereof is connected to a first ground terminal, and a control terminal thereof is connected to the output terminal of the second control unit;
wherein, a common terminal of the second terminal of the first switch transistor and the first terminal of the second switch transistor is connected to a first terminal of the inductor.

18. The switching power supply according to claim 17, wherein the first control unit comprises:
an auxiliary winding configured to be provided at a primary side of the transformer, wherein a second terminal of the auxiliary winding is connected to the first ground terminal; and
a second switch element, which is configured so that a first terminal thereof is connected to a first terminal of the auxiliary winding, and a second terminal thereof is connected to the output terminal of the first control unit.

19. The switching power supply according to claim 17, wherein the first control unit comprises:

an auxiliary winding, which is configured so that a second terminal thereof is coupled to the first ground terminal;

a second switch element, which is configured so that a first terminal thereof is connected to an output side of the power converter;

an eighth resistor, which is configured so that a first terminal thereof is connected to a second terminal of the second switch element, and a second terminal thereof is coupled to a second ground terminal;

a third switch element, which is configured so that a control terminal thereof is connected to a common terminal of the eighth resistor and the second switch element, and a second terminal thereof is coupled to the second ground terminal;

a ninth resistor, which is configured so that a first terminal thereof is connected to the first terminal of the second switch element, and a second terminal thereof is connected to a first terminal of the third switch element;

an isolator, which is configured so that a first input terminal thereof is connected to a common terminal of the first terminal of the third switch element and the ninth resistor, a second input terminal thereof is coupled to the second ground terminal, a first output terminal thereof is connected to the variable resistor unit, and a second output terminal thereof is coupled to the first ground terminal; and a fifth resistor, which is configured so that a first terminal thereof is connected to a first terminal of the auxiliary winding, and a second terminal thereof is connected to the first output terminal of the isolator.

20. A switching power supply comprising:

a power converter, comprising:

a transformer configured to perform voltage conversion on input voltage of the power converter, wherein the transformer comprises:

a primary winding, which is configured so that a first terminal thereof is connected to an external power source; and a secondary winding, which is configured so that a first terminal thereof outputs an output voltage, a second terminal thereof is coupled to a second ground terminal; and a switch unit configured, which is so that a first terminal thereof is connected to a second terminal of the primary winding;

a first control unit, which is coupled to the power converter to detect an output voltage of the power converter and is configured to generate a first control signal based on the output voltage, wherein the first control unit comprises:

an auxiliary winding at a primary side of the transformer, wherein a second terminal of the auxiliary winding is coupled to a first ground terminal; and a second switch element, which is configured so that a first terminal thereof is connected to a first terminal of the auxiliary winding, and a second terminal thereof is connected to an output terminal of the first control unit, wherein the output terminal of the first control unit outputs the first control signal;

a variable resistor unit, which is connected to the output terminal of the first control unit and is configured to generate a resistance value based on the first control signal, the variable resistor unit comprises:

a first resistor branch, comprising:

a first resistor, which is configured so that a first terminal thereof is connected to a second terminal of the switch unit, and a second terminal thereof is connected to the first ground terminal;

a second resistor branch, comprising:

a second resistor, which is configured so that a first terminal thereof is connected to the first terminal of the first resistor; and a first switch element, which is configured so that a first terminal thereof is connected to a second terminal of the second resistor, a second terminal thereof is connected to the first ground terminal, and a control terminal thereof is connected to the output terminal of the first control unit; and a second control unit, which is configured so that a first input terminal thereof is connected to a common terminal of the second resistor and the first resistor of the variable resistor unit, an output terminal thereof is connected to a control terminal of the switch unit to output a second control signal.

21. The switching power supply according to claim 20, wherein, the first switch element is a field effect transistor or a bipolar transistor, and the second switch element is a Zener diode.

22. The switching power supply according to claim 20, further comprising:

a diode configured so that an anode thereof is connected to the first terminal of the auxiliary winding, and a cathode thereof is connected to the first terminal of the second switch element.

23. The switching power supply according to claim 20, wherein the primary winding, the secondary winding and the switch unit form a flyback circuit.

* * * * *